US009076080B1

(12) United States Patent
Florissi

(10) Patent No.: US 9,076,080 B1
(45) Date of Patent: *Jul. 7, 2015

(54) AUTOMATED DIAGNOSTIC ANALYSIS OF IMAGE DATA

(71) Applicant: EMC Corporation, Hopkinton, MA (US)

(72) Inventor: Patricia Gomes Soares Florissi, Briarcliff Manor, NY (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/288,447

(22) Filed: May 28, 2014

Related U.S. Application Data

(63) Continuation of application No. 12/976,229, filed on Dec. 22, 2010, now Pat. No. 8,774,530.

(51) Int. Cl.
*G06K 9/62* (2006.01)
*G06T 7/00* (2006.01)

(52) U.S. Cl.
CPC .......... *G06K 9/6267* (2013.01); *G06T 7/0012* (2013.01); *G06T 2207/20021* (2013.01)

(58) Field of Classification Search
CPC .......... G06K 9/6282; G06K 9/00718; G06K 9/00288
USPC ........................................................ 382/128
See application file for complete search history.

(56) References Cited

U.S. PATENT DOCUMENTS

| | | | |
|---|---|---|---|
| 6,704,466 B1 * | 3/2004 | Yamamoto et al. | 382/305 |
| 7,587,068 B1 | 9/2009 | Steinberg et al. | |
| 7,929,756 B2 | 4/2011 | Curti et al. | |
| 8,086,037 B2 | 12/2011 | Yang | |
| 8,200,025 B2 | 6/2012 | Woodbeck | |
| 8,688,729 B2 * | 4/2014 | Gagliardi et al. | 707/769 |
| 2005/0129316 A1 | 6/2005 | Curti et al. | |
| 2005/0169509 A1 | 8/2005 | Grasslin et al. | |
| 2011/0205399 A1 | 8/2011 | Gao et al. | |

OTHER PUBLICATIONS

"Digital Slides and Third-Party Data Interchange," Aperio Technologies, Inc., Dec. 2008, 24 pages.

* cited by examiner

*Primary Examiner* — Samir Ahmed
*Assistant Examiner* — Totam Le
(74) *Attorney, Agent, or Firm* — Ryan, Mason & Lewis, LLP

(57) ABSTRACT

An information processing system is configured for automated diagnostic analysis of digital images. The system comprises an image classifier implementing an image processing engine for performing at least a portion of a classification operation on at least a portion of an image. The image processing engine comprises an interconnection of at least one image planner element, a plurality of image scrutinizer elements and at least one image aggregator element. The image planner element is configured to organize the plurality of image scrutinizer elements into two or more logical groups of image scrutinizer elements based at least in part on one or more criteria to be used in performing the classification operation.

20 Claims, 15 Drawing Sheets

AUTOMATED DIAGNOSTIC ANALYSIS OF IMAGE DATA

RELATED APPLICATION

The present application is a continuation of U.S. patent application Ser. No. 12/976,229, filed Dec. 22, 2010 and entitled "Automated Diagnostic Analysis of Image Data," the disclosure of which is incorporated by reference herein.

FIELD OF THE INVENTION

The present invention relates generally to the field of information processing, and more particularly to techniques for analyzing image data.

BACKGROUND OF THE INVENTION

The analysis of image data is becoming increasingly important in a wide variety of applications. For example, in medical applications, such as digital pathology, image analysis is routinely utilized to detect and diagnose numerous conditions. Other examples of image analysis applications include security applications involving image or face recognition, and oil and gas exploration applications involving analysis of geological images.

Unfortunately, conventional techniques for image analysis suffer from a number of significant drawbacks. For example, image analysis in many cases remains unduly human intensive. This is particularly true in digital pathology, where millions of medical images are analyzed every year by specialists and other medical professionals. These experts study medical images and try to identify patterns they have seen before. However, there is generally no mechanism available that leverages previous image analyses across multiple experts in an accurate and efficient way. Instead, the results of image analyses performed by these various experts typically remain scattered across unrelated processing systems. This also makes it very difficult to gather statistical information which could be useful in further improving the accuracy and efficiency of the image analysis process.

Existing automated techniques for image analysis are also problematic. Such techniques often demand excessive amounts of processor and memory resources, and are therefore unduly limited in terms of the number and type of image comparisons that can be performed using readily available amounts of resources.

Accordingly, a need exists for improved image data analysis techniques, which can leverage the results of previous image analyses by large numbers of distributed experts in an accurate and efficient manner, and without requiring the use of excessive amounts of processor and memory resources.

SUMMARY OF THE INVENTION

An illustrative embodiment of the present invention provides an information processing system configured for automated diagnostic analysis of images.

In one aspect, an information processing system comprises an image classifier implementing an image processing engine for performing at least a portion of a classification operation on at least a portion of an image. The image processing engine comprises an interconnection of at least one image planner element, a plurality of image scrutinizer elements and at least one image aggregator element. The image planner element is configured to organize the plurality of image scrutinizer elements into two or more logical groups of image scrutinizer elements based at least in part on one or more criteria to be used in performing the classification operation.

The illustrative embodiments advantageously overcome one or more of the above-noted drawbacks of conventional approaches. For example, one or more of these embodiments can automatically leverage the results of previous image analyses for large numbers of images in an accurate and efficient manner, thereby facilitating subsequent image analyses as well as the gathering of associated statistical information. Also, image analysis performance is improved in a manner that conserves processor and memory resources. As another example, processing engines formed using various combinations of image planner, image scrutinizer and image aggregator elements can be configured for massive parallel processing of image data, using large numbers of geographically distributed servers, computers or other machines connected to the Internet.

These and other features and advantages of the present invention will become more readily apparent from the accompanying drawings and the following detailed description.

DETAILED DESCRIPTION

The present invention will be described herein with reference to exemplary information processing systems and associated servers, computers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
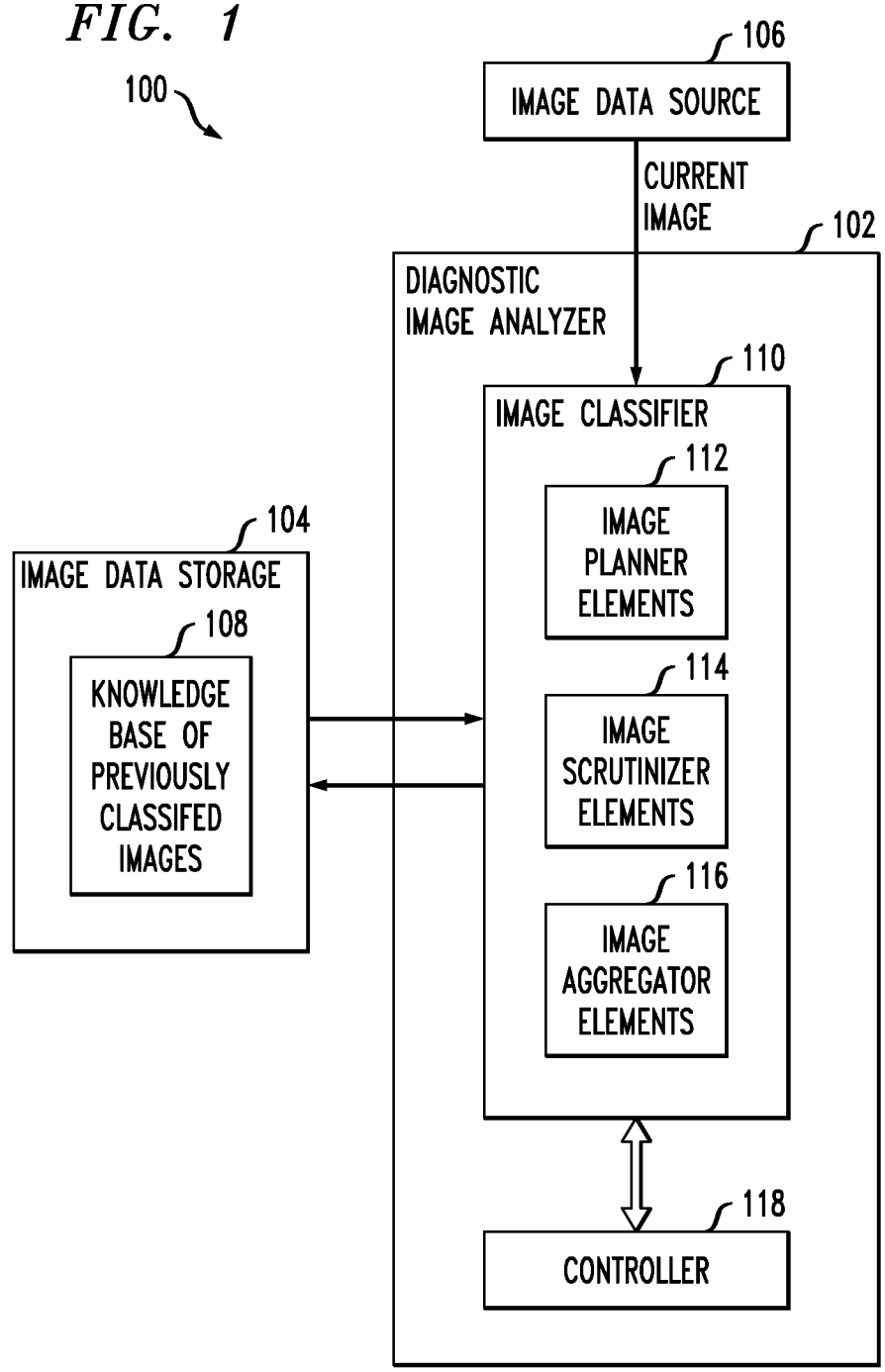
FIG. 1 shows an information processing system configured for automatic diagnostic analysis of digital images in an illustrative embodiment of the invention.

FIG. 1 shows an information processing system 100 configured in accordance with an illustrative embodiment of the invention. The system 100 in this embodiment comprises a diagnostic image analyzer 102 coupled to image data storage 104 and an image data source 106. The image data storage 104 comprises a knowledge base 108 of previously classified images. These may be images previously classified by an image classifier 110 of the diagnostic image analyzer 102 or by one or more other image classifiers not specifically shown. Such other image classifiers may be part of the analyzer 102 or part of other similar analyzers within the system. It should be noted that the knowledge base 108 need not store the previously classified images in their entirety, but could instead store information regarding these images, such as classification results for the images in conjunction with links to other storage locations where the actual images are held.

The image data source 106 supplies a current image to the diagnostic image analyzer 102 for classification by the image classifier 110. The knowledge base 108 of previously classified images is leveraged by the image classifier 110 in performing this classification of the current image from image data source 106. Also, the results of the classification of the current image are provided back to the knowledge base 108 for use by the image classifier 110 in classifying subsequent images. Although image data source 106 is illustratively shown as being separate from the image data storage 104 in FIG. 1, in other embodiments the image data source could be part of the image data storage. The entire current image need not be provided to the image classifier 110, as it is possible that the classifier may make its classification decision utilizing only a portion of the image. For example, detection of certain designated markers in one or more designated portions of an image may be sufficient to indicate the presence of a particular disease or condition in a digital pathology application.

The image classifier 110 of diagnostic image analyzer 102 in this embodiment comprises image planner elements 112, image scrutinizer elements 114 and image aggregator elements 116. These elements are configured under the control of controller 118 to form processing engines for diagnostic image analyses. Examples of such processing engines formed using various combinations of elements 112, 114 and 116 will be described below in conjunction with FIGS. 4 and 6-15. In one or more of these exemplary processing engines, the image planner elements 112 distribute portions of the current image to respective ones of the image scrutinizer elements 114, which perform comparisons as part of the image classification process, and the image aggregator elements 116 combine the comparison results from the image scrutinizer elements. It should be noted that the elements 112, 114 and 116 may comprise software that runs on general-purpose processing hardware.

The various elements 102, 104 and 106 of information processing system 100 may be implemented at least in part using public or private cloud infrastructure, or other distributed virtual infrastructure. Such a distributed virtual infrastructure may comprise, by way of example, a hypervisor platform and associated virtual processing and storage elements. An example of a commercially available hypervisor platform suitable for use in an embodiment of the invention is the VMware® vSphere™ which includes vCenter™. The distributed virtual infrastructure may further comprise one or more distributed processing platforms that include hardware products such as Celerra® and Clariion®, both commercially available from EMC Corporation of Hopkinton, Mass.

It is to be appreciated that the particular arrangement of elements shown in FIG. 1 is presented by way of illustrative example only, and in other embodiments different arrangements of additional or alternative elements may be used. Moreover, the functionalities associated with separate elements in the FIG. 1 embodiment may be combined into a lesser number of elements each of which performs multiple functions. Thus, at least a subset of the elements may be collectively implemented on a common processing platform, or each such element may be implemented on a separate processing platform comprising one or more servers, computers or other processing devices.

Figure 2:
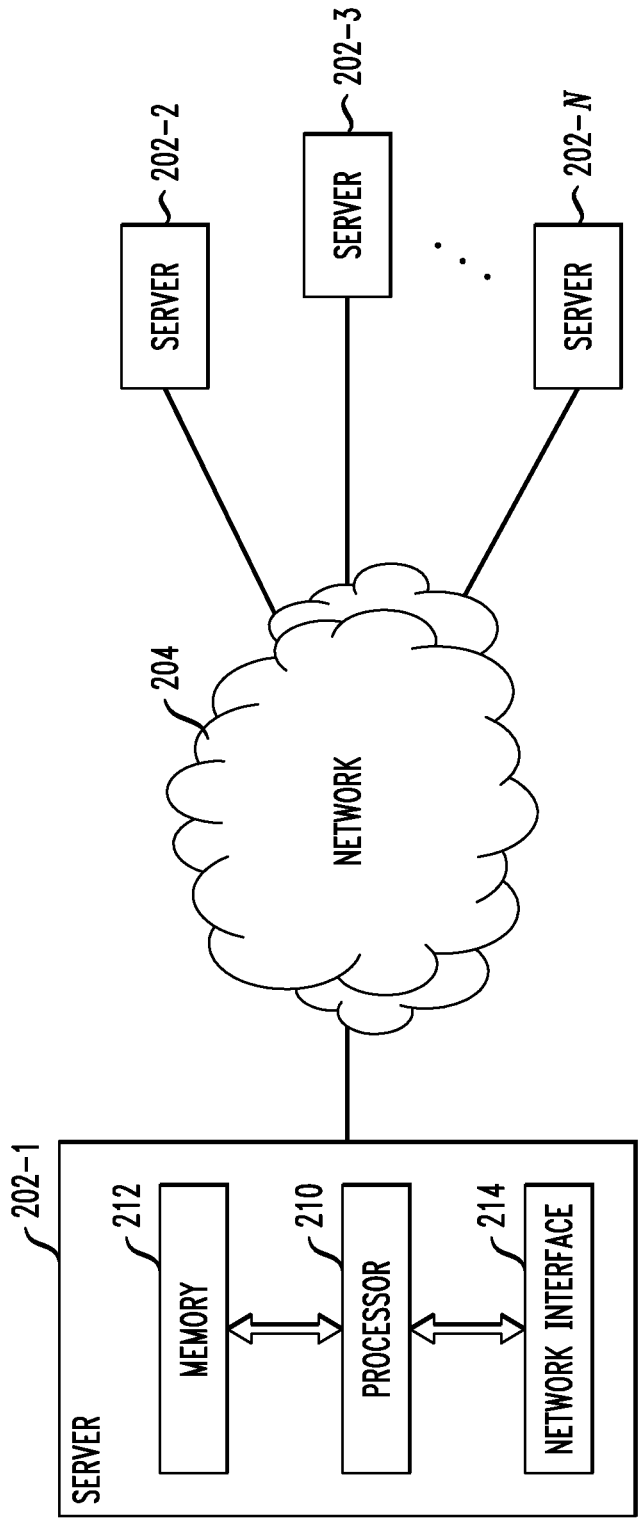
FIG. 2 shows a more detailed view of a portion of the FIG. 1 system.

An example of such a processing platform is processing platform 200 shown in FIG. 2. The processing platform 200 in this embodiment comprises at least a portion of the system 100 and includes a plurality of servers, denoted 202-1, 202-2, 202-3, . . . 202-N, which communicate with one another over a network 204. One or more of the elements 102, 104 or 106 of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of the information processing system 100. Again, multiple elements may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code when executed by a processing device such as the server 202-1 causes the device to perform functions associated with one or more of the elements 102, 104 and 106, or portions thereof. One skilled in the art would be readily able to implement such software given the teachings provided herein. Other examples of computer program products embodying aspects of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 100 may include additional or alternative processing platforms, as well as numerous distinct processing platforms in any combination.

It should be understood that a given embodiment of the system 100 may include multiple instances of the elements 102, 104, 106 and 108, and other system elements, although only single instances of such elements are shown in the system diagram for clarity and simplicity of illustration.

Also, numerous other arrangements of servers, computers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

The operation of the diagnostic image analyzer 102 will now be described in greater detail with reference to FIGS. 3 through 15.

Figure 3:
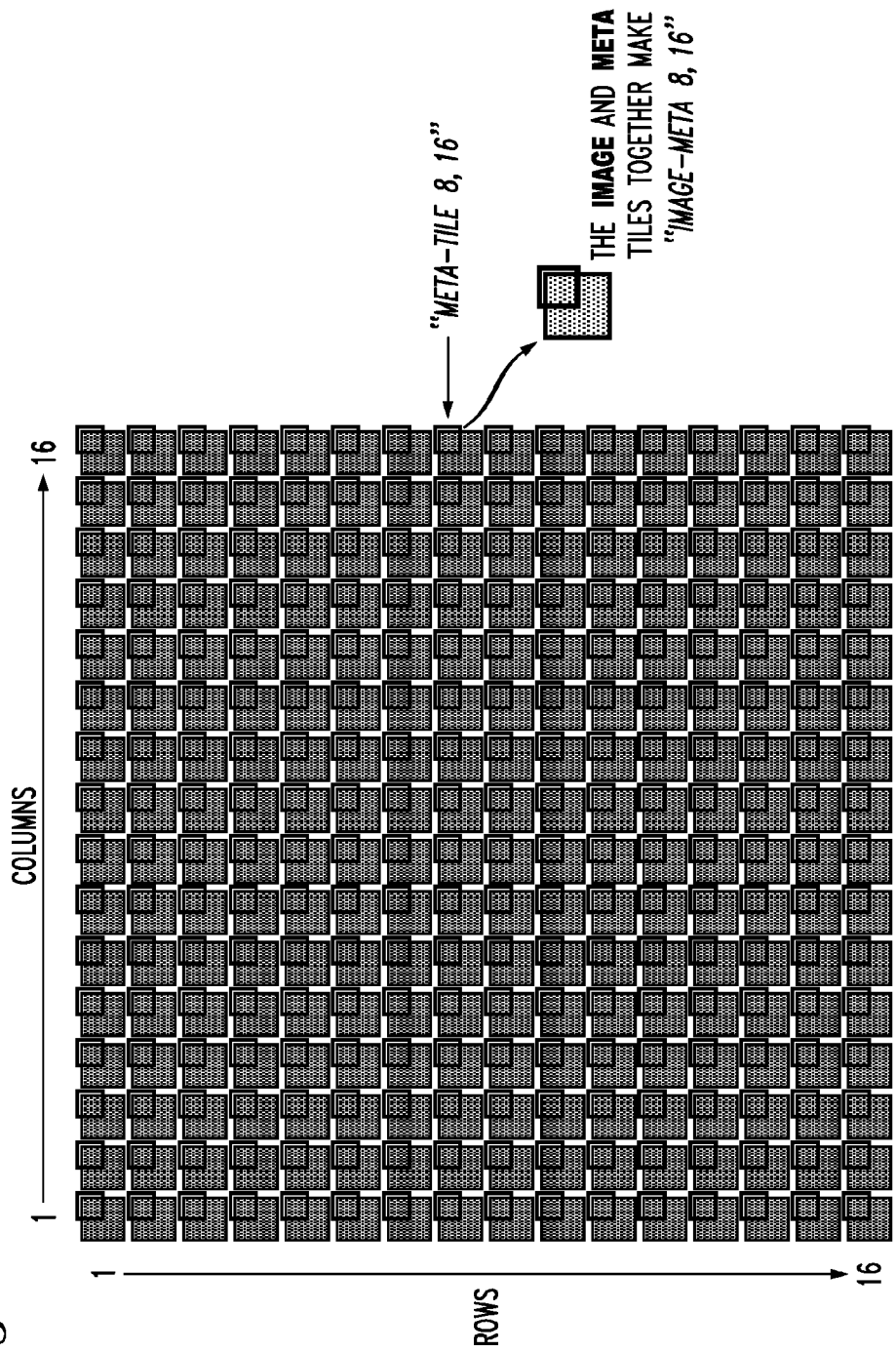
FIGS. 3-5 illustrate exemplary subdivided images and associated meta-information that are processed by the FIG. 1 system.

Referring initially to FIG. 3, an illustrative arrangement of image data is shown for an image processed by the diagnostic image analyzer 102. In this arrangement, the image is subdivided into a plurality of different sub-portions or "tiles" that are individually referenced by row and column numbers. There are 16 rows and 16 columns, and thus 256 image tiles, in this particular example. Associated with each of the image tiles is a corresponding "shadow tile" or meta-tile. Each meta-tile contains the minimum information required to identify its corresponding image tile, and may also include other information about that image tile. For example, meta-tile 8,16 contains information about image tile 8,16, which is the image tile located at the intersection of row 8 and column 16 in the subdivided image. A given image tile and its corresponding meta-tile are collectively referred to herein as an "image-meta pair." Thus, the image-meta pair denoted image-meta 8,16 comprises image tile 8,16 and the corresponding meta-tile 8,16.

Figure 4:
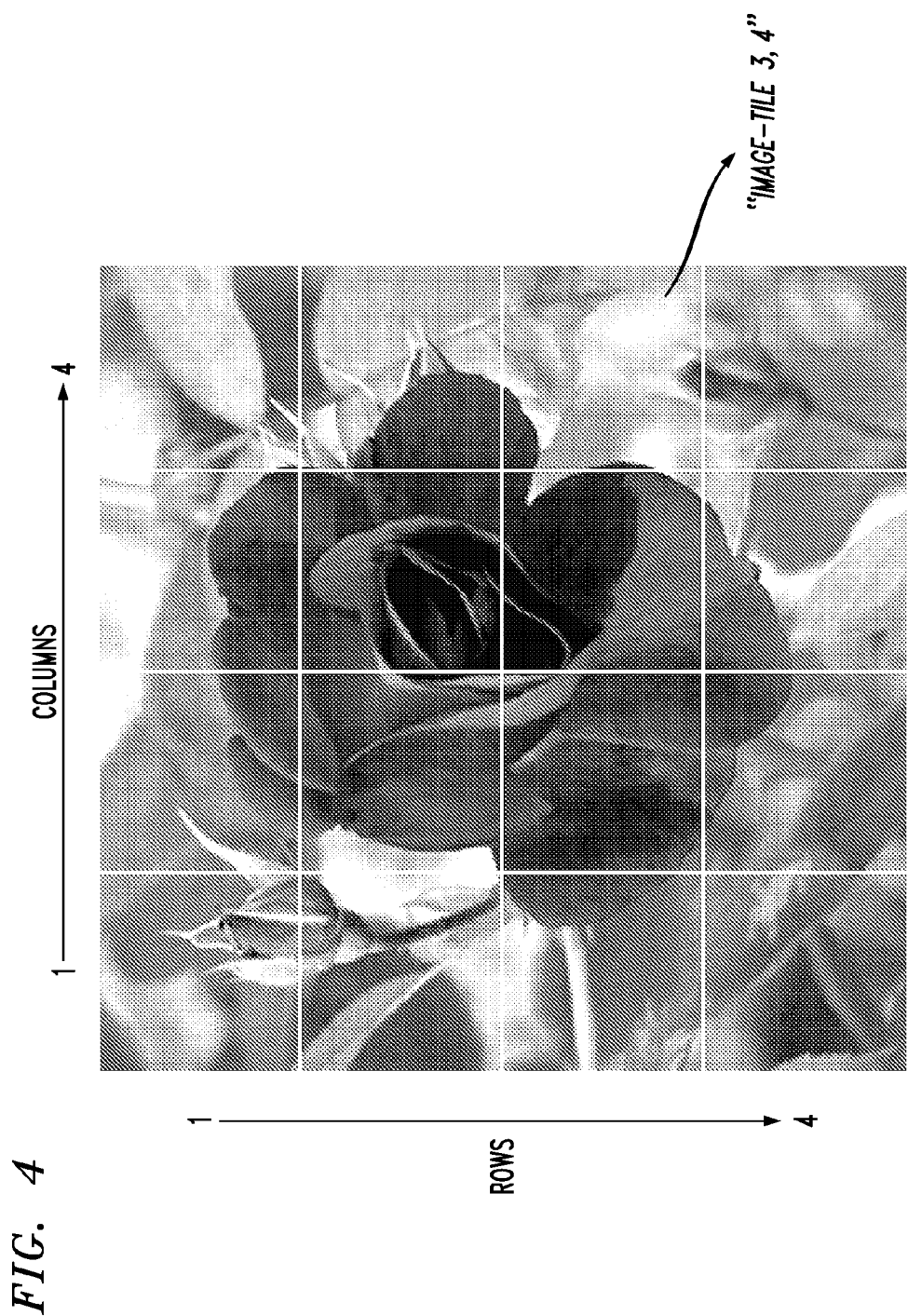

Another example of a subdivided image is shown in FIG. 4. In this example, the image is subdivided into 16 image tiles, each having an associated meta-tile. Portions of the information in certain of the meta-tiles are shown in more detail in FIG. 5. In this example, the meta-tiles indicate the relative concentrations of particular colors that are present in the corresponding image tiles. More specifically, meta-tile 1,4 indicates that image tile 1,4 is 14% yellow, 37% light green and 49% green, meta-tile 2,4 indicates that image tile 2,4 is 6% yellow, 62% light green, 7% green and 25% red, and meta-tile 3,4 indicates that image tile 3,4 is 64% yellow, 33% light green and 3% red. Again, a given image tile and its associated meta-tile collectively form an image-meta pair. Thus, image tile 3,4 and meta-tile 3,4 collectively form the image-meta pair that is denoted image-meta 3,4.

Figure 5:
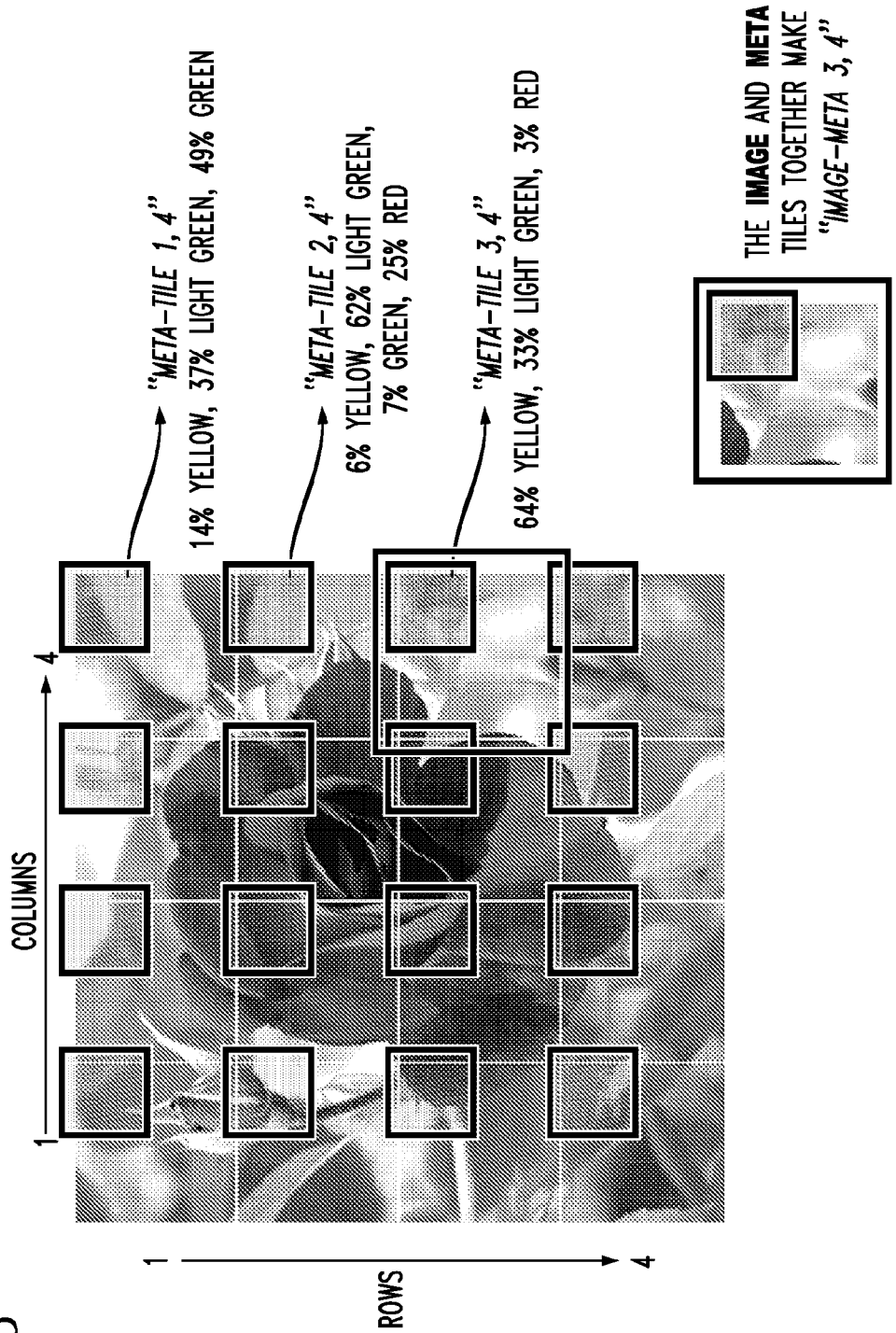
Figure 6:
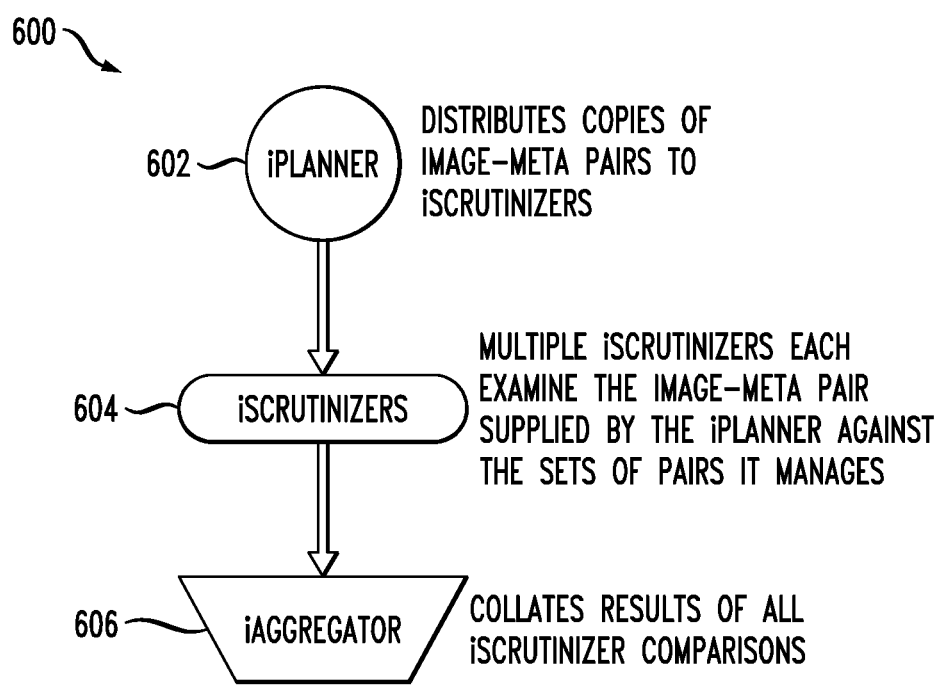
FIG. 6 shows a processing engine for processing image data in the FIG. 1 system.

FIG. 6 shows a processing engine 600 for processing image data comprising image-meta pairs of the type shown in FIGS. 3 and 5. In this example, the processing engine comprises a single image planner 602, multiple image scrutinizers 604, and a single image aggregator 606. The image planner, image scrutinizer and image aggregator elements are also referred to herein as iPlanners, iScrutinizers and iAggregators, respectively. The image planner 602 distributes copies of image-meta pairs to the image scrutinizers 604. Each of the image scrutinizers 604 examines the image-meta pair supplied by the image planner 602 against the set of one or more image-meta pairs it manages. The image aggregator 606 collates results of all the image scrutinizer comparisons. The various image planner, image scrutinizer and image aggregator elements of the processing engine 600 are selected from the respective sets 112, 114 and 116 of such elements in the image classifier 110 of FIG. 1.

Processing engines formed using various combinations of image planner, image scrutinizer and image aggregator elements as disclosed herein can be advantageously configured for parallel processing of image data. For example, such arrangements are well suited for a massive parallel processing environment comprising processing elements distributed worldwide. More particularly, any machine connected to the Internet could become an image scrutinizer and manage one or more pieces of information. Once a diagnostic analysis request is made, the image or suitable portions thereof could be broadcast to all image scrutinizers or to certain layers of image scrutinizers, and those image scrutinizers can operate in parallel to process the image data. Numerous other parallel processing arrangements of image planner, image scrutinizer and image aggregator elements may be used in a given embodiment. The particular processing hardware utilized to implement image planner, image scrutinizer and image aggregator elements can therefore vary from embodiment to embodiment.

FIGS. 7 through 10 illustrate in more detail the processing of the image data of FIGS. 4 and 5 using the processing engine 600 of FIG. 6 in one embodiment. It should be noted that these figures, and others described herein, are merely illustrative examples of possible arrangements of image planner, image scrutinizer and image aggregator elements.

Figure 7:
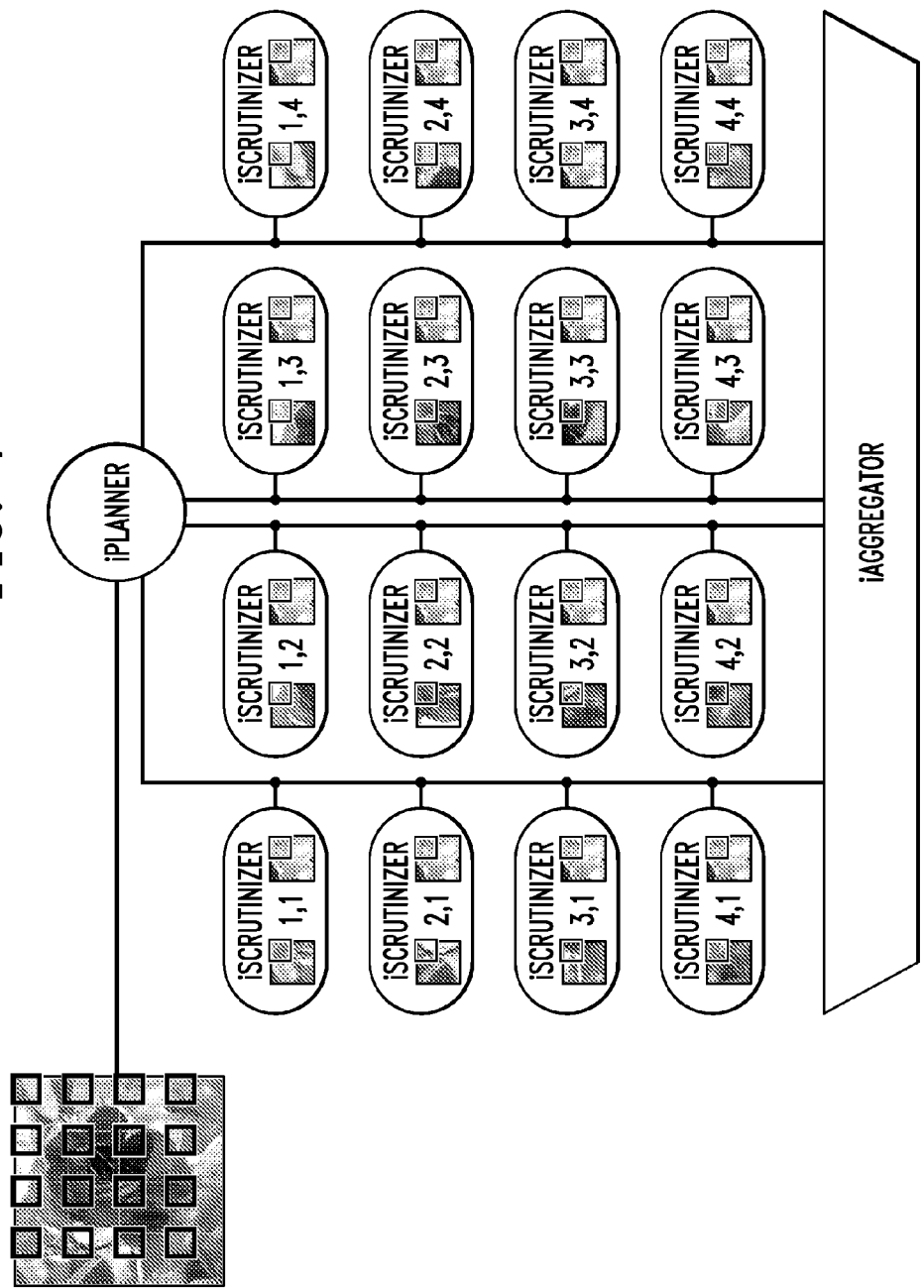
FIGS. 7-12 show different arrangements of image planner, image scrutinizer and image aggregator elements as applied to processing of the image data of FIGS. 4 and 5.

Referring now to FIG. 7, one possible arrangement of image planner, scrutinizer and aggregator elements is shown in greater detail. There is one image scrutinizer for each of the 16 tiles of the subdivided image. Each image scrutinizer in this embodiment therefore manages a single image-meta pair, as indicated in the figure. The image planner supplies image-meta pairs of an image to be classified to respective ones of the image scrutinizers. The comparisons performed by the image scrutinizers in this example proceed one tile at a time. That is, a particular image-meta pair for a corresponding tile of the image to be classified is supplied by the image planner to each of the image scrutinizers in parallel, and each image scrutinizer then compares that received tile with the image-meta pair that it manages.

Figure 8:
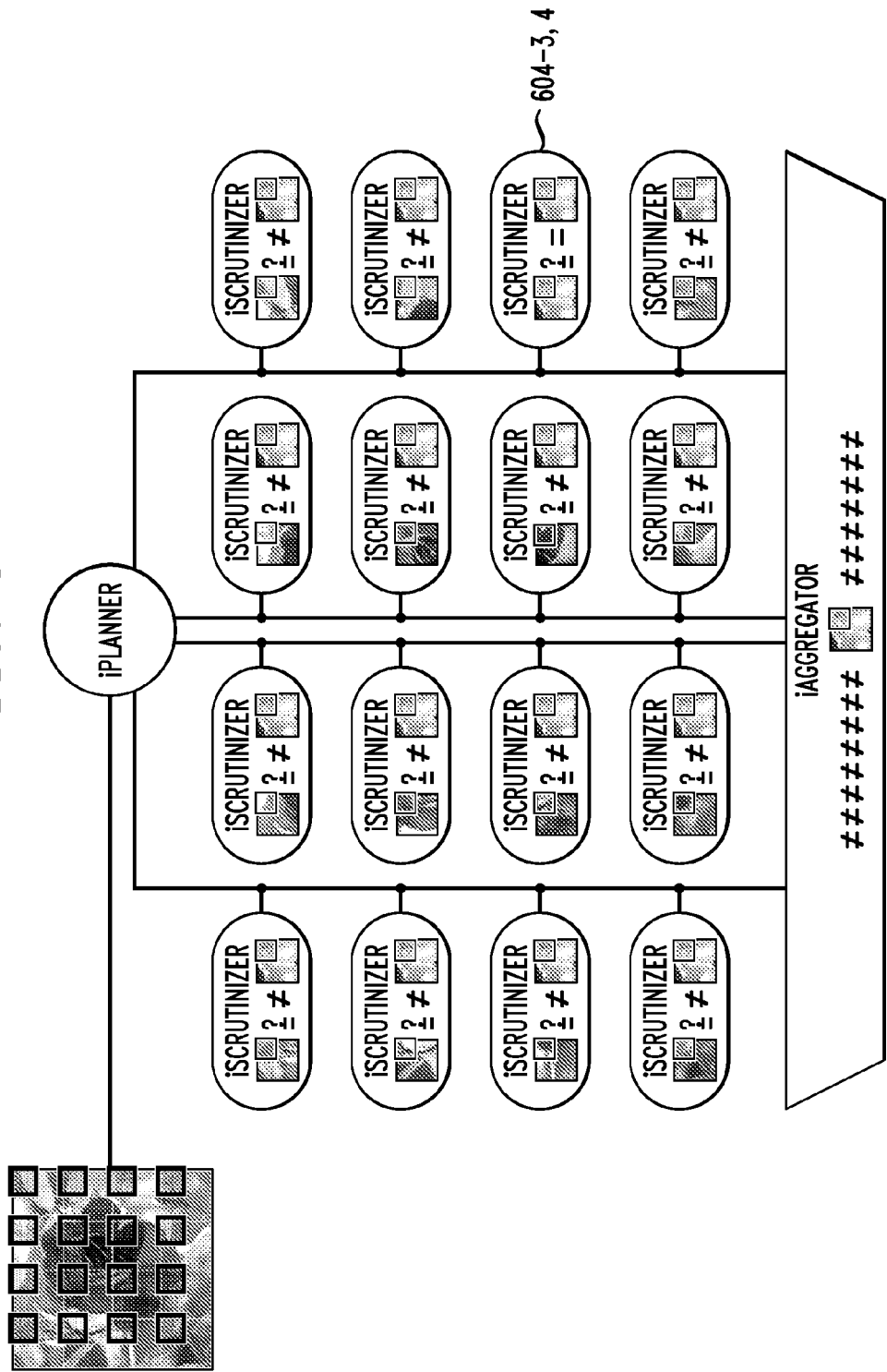

As shown more particularly in FIG. 8, each image scrutinizer determines if there is a match between the tile currently being processed and the tile corresponding to the image-meta pair it manages. In this example, the image scrutinizer 604-3,4 which manages image-meta pair 3,4 finds a match, while all other image scrutinizers indicate no match. The image aggregator therefore receives a no-match indicator ("≠") from 15 of the 16 image scrutinizers, and a match indicator ("=") only from image scrutinizer 604-3,4.

In this particular example, the image scrutinizer returns a binary answer indicating a complete match or a no match. Other image scrutinizers may return different types of results. For example, they may indicate a distance rate, indicating how far or how close the images are, enabling a near match situation to be detected. In another example, they may return a matrix indicating for each meta-data, whether there is a match or not. For example, such a matrix may indicate whether the images match on the percentage of red, blue and yellow. This example may be of particular value in digital pathology analysis, for example, where the intensity of the color or texture of certain cells indicate the presence of abnormal conditions. As a more specific example, cancer cells typically present certain levels of intensity on specific parameters that can be compared. These and other markers indicative of certain diseases or conditions may be detected as part of the image classification process implemented by image classifier 110 of diagnostic image analyzer 102.

Figure 9:
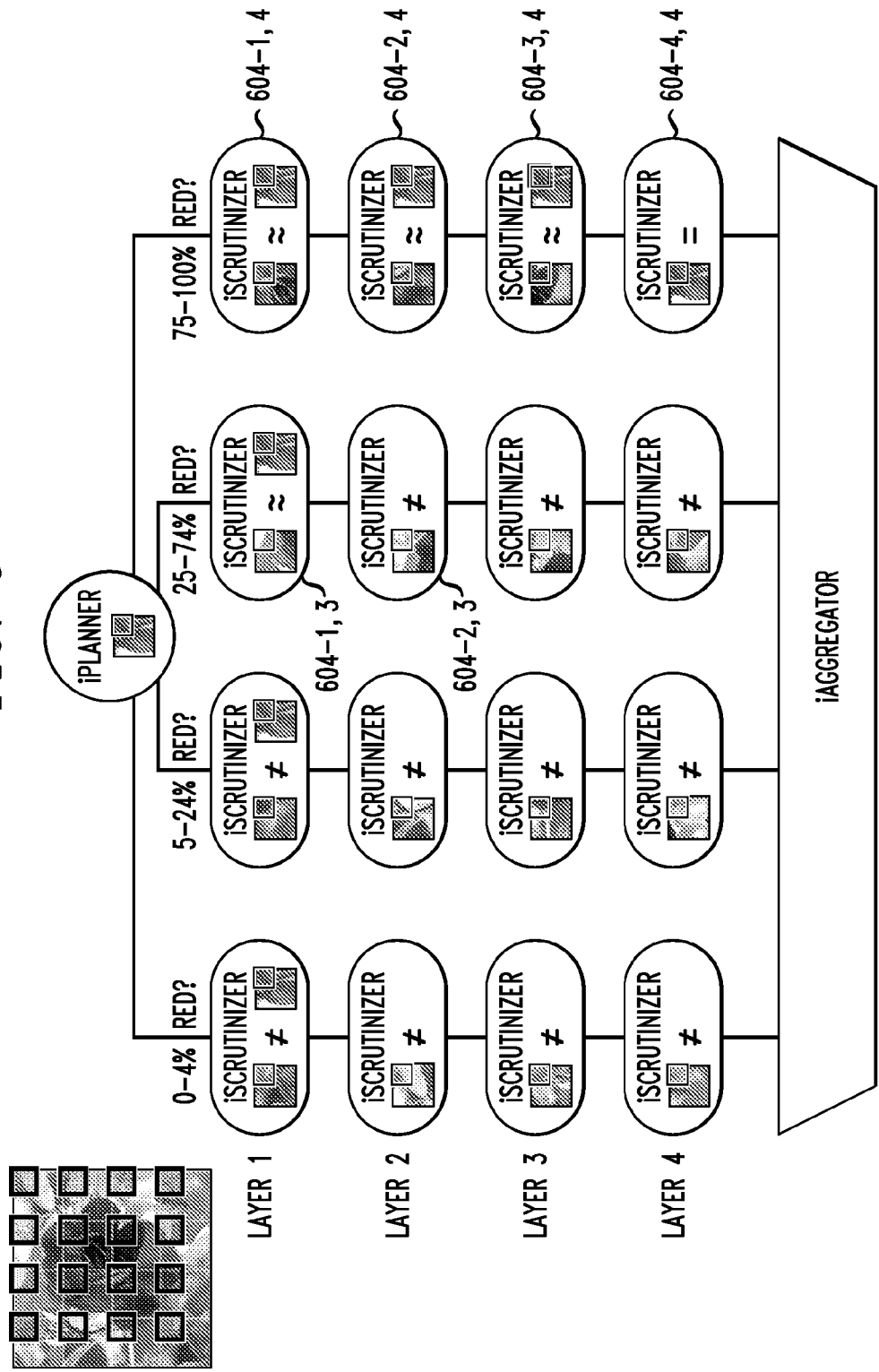

The processing engine 600 may be configured to perform other types of operations using a layered approach, as illustrated in FIG. 9. In this example, the image scrutinizers 604 are arranged in layers, denoted Layer 1, Layer 2, Layer 3 and Layer 4. The layers are logical layers defined by the image planner 602 to organize the image scrutinizers. The same image scrutinizers can have multiple layering classifications simultaneously.

The operations performed by the image scrutinizers 604 in this example are collectively designed to determine the percentage of the color red in a particular image tile being processed. Each column of image scrutinizers corresponds to a different range of percentages of the color red, with ranges of 0-4%, 5-24%, 25-74% and 75-100% being assigned to the respective columns. Tiles propagate to lower layers of image scrutinizers only after matching the specified criteria at higher layers. Thus, for example, an indication of a possible match ("≈") at image scrutinizer 604-1,3 at Layer 1 allows the processed tile to propagate to the next image scrutinizer 604-2,3 at Layer 2, which generates a no-match indicator ("≠"). Similarly, an indication of a possible match ("≈") at image scrutinizer 604-1,4 at Layer 1 allows the processed tile to propagate to the next image scrutinizer 604-2,4 at Layer 2, and then to the next image scrutinizer 604-3,4 at Layer 3, and finally to image scrutinizer 604-4,4 at Layer 4, which generates a match indicator ("="). Of course, various image characteristics other than color may be used to arrange and configure the image scrutinizers of the processing engine. Such characteristics may be selected based on the needs of the particular diagnostic application in which the system 100 is deployed.

Figure 10:
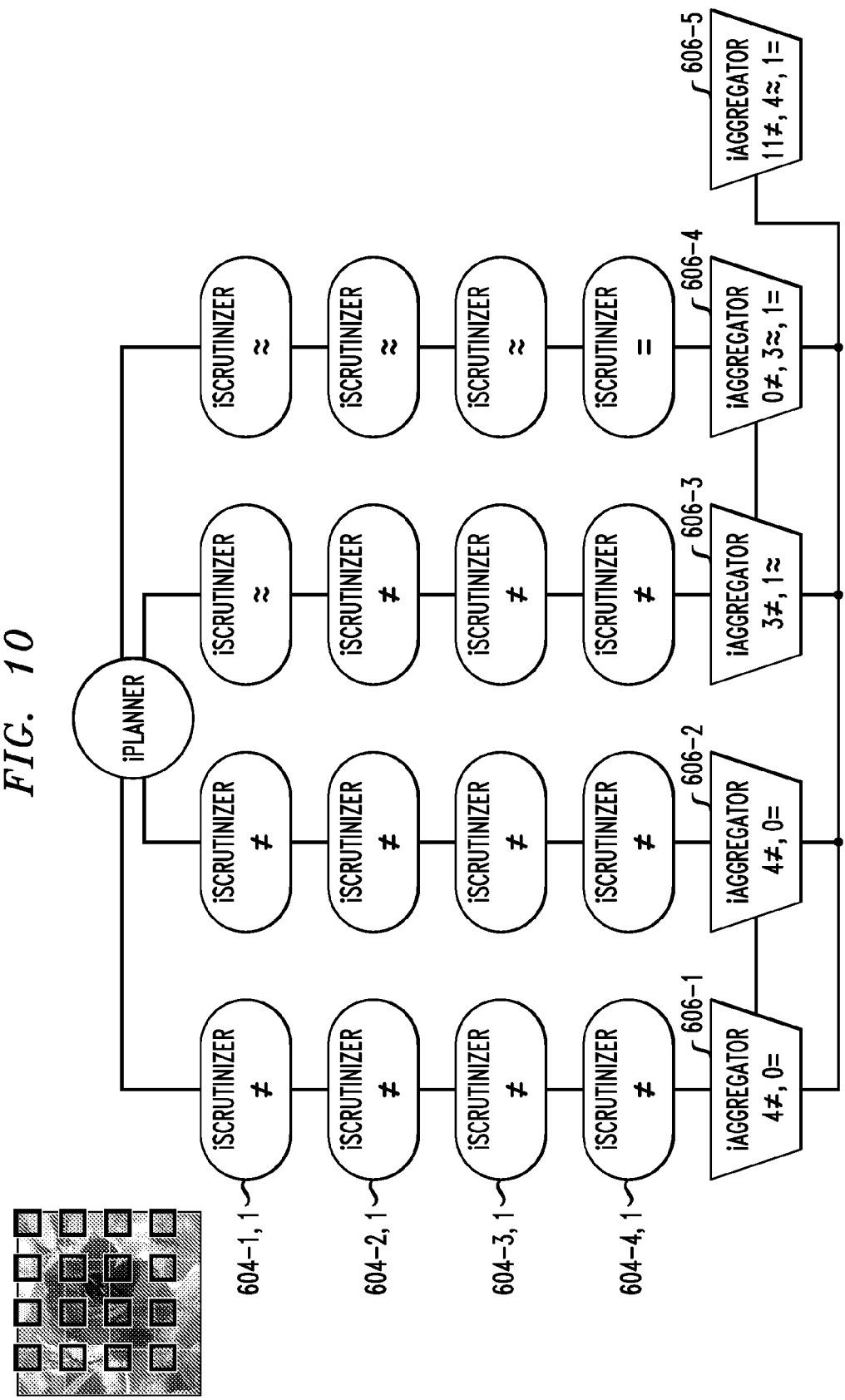

FIG. 10 illustrates the manner in which multiple image aggregators 606 may be configured to operate in parallel to facilitate the processing of the results from the image scrutinizers 604. In this example, the match results are shown for each of the image scrutinizers for a given processed tile. Associated with each column of image scrutinizers in this embodiment is a separate image aggregator which aggregates the results from the image scrutinizers in that column. Thus, for example, image aggregator 606-1 aggregates the match results from the four image scrutinizers 604-1,1, 604-2,1, 604-3,1 and 604-4,1, with the aggregated results indicating four no-match indicators ("≠") and zero match indicators ("="). The other image aggregators similarly combine the results from the image scrutinizers in their corresponding columns. An additional image aggregator 606-5 combines the results from the other image aggregators 606-1 through 606-4, resulting in aggregated results of 11 no-match indicators ("≠"), 4 possible match indicators ("≈"), and one match indicator ("=").

Figure 11:
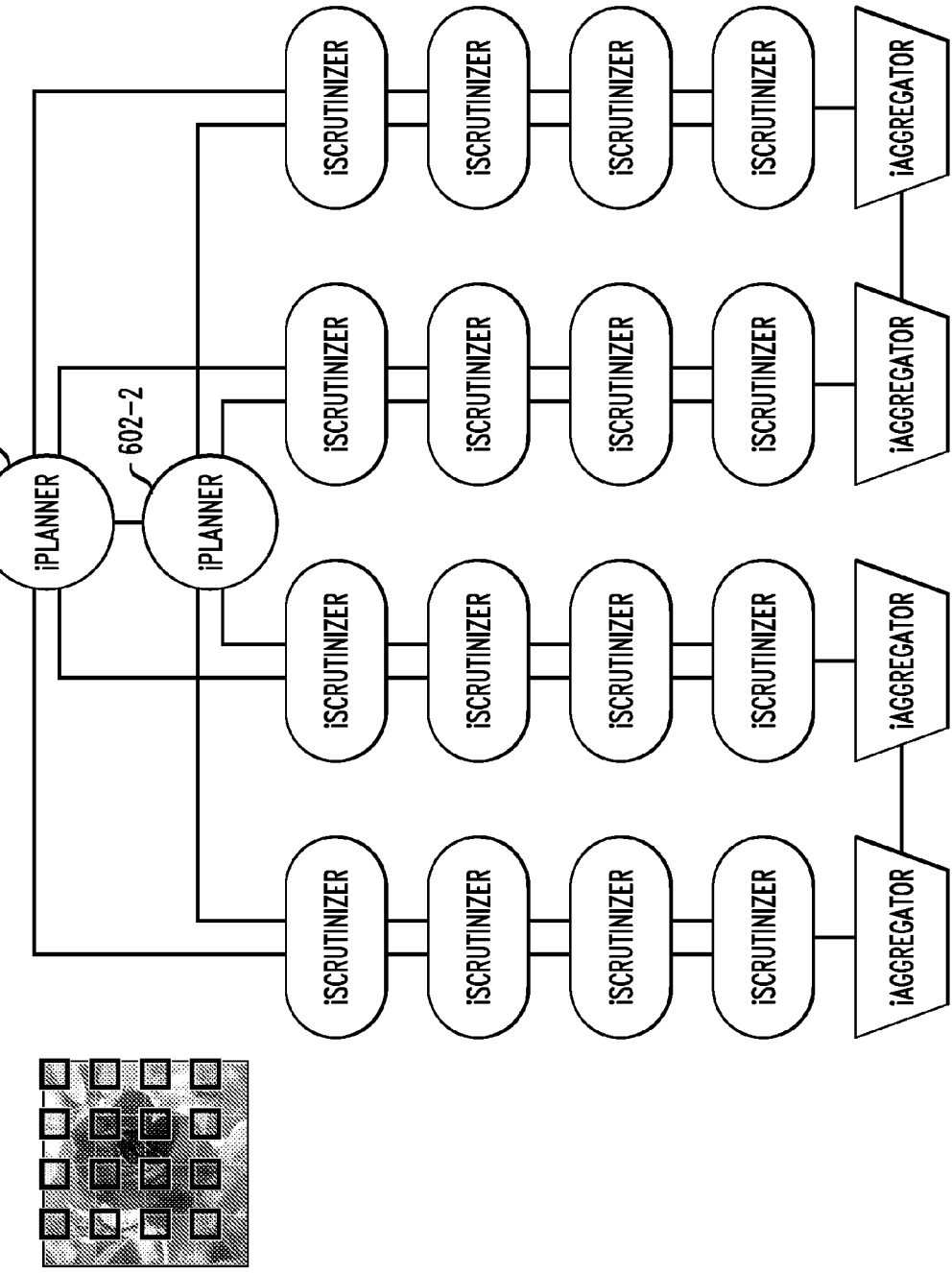

It is also possible for a given processing engine to include multiple image planner elements. An example of such an arrangement is shown in FIG. 11. In this example, there are two image planners 602-1 and 602-2, each of which is coupled to each of the image scrutinizer elements. Such an arrangement is useful to facilitate load balancing among the image scrutinizers.

Figure 12:
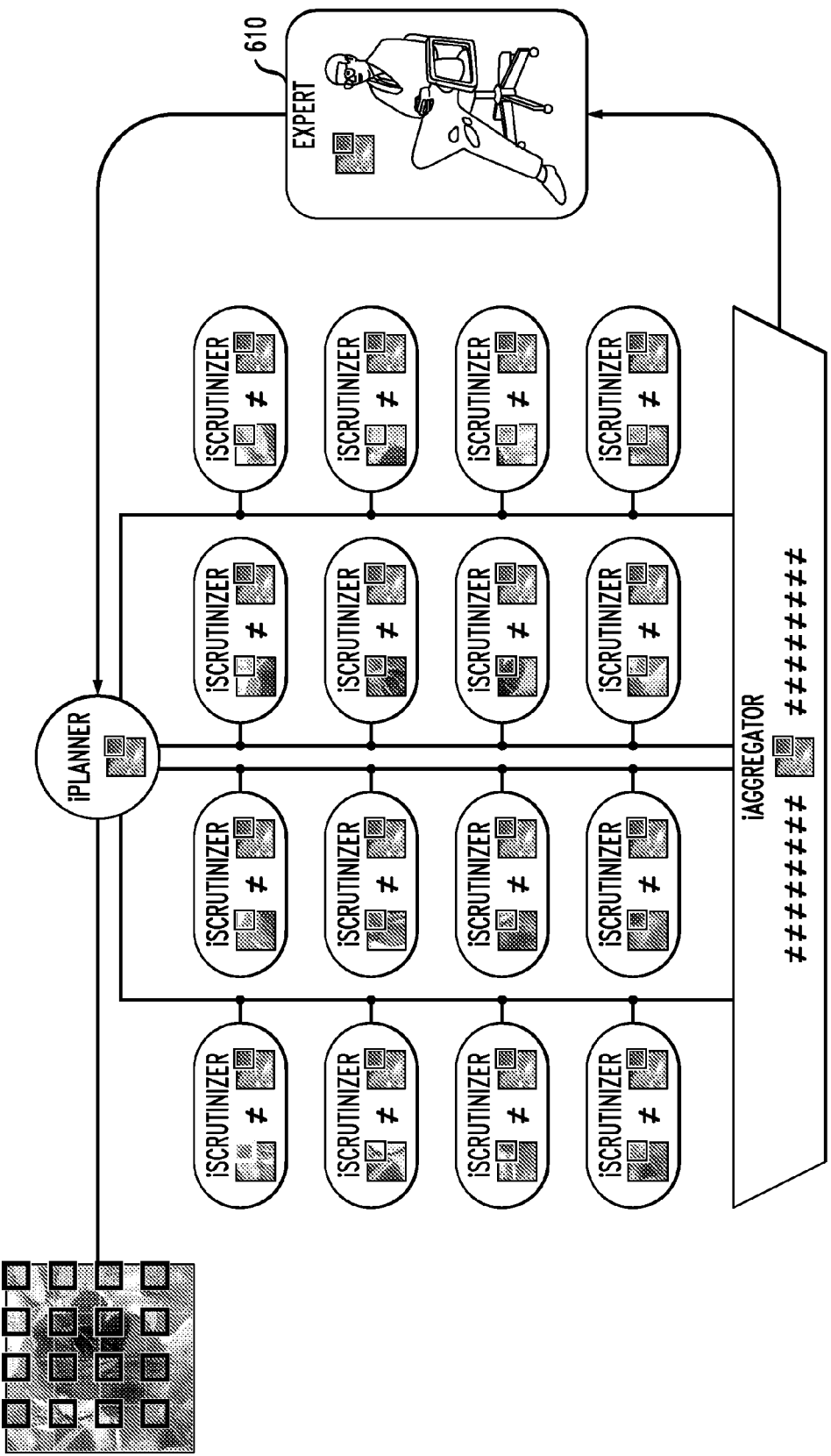

The processing engine 600 may also include feedback from the image aggregator 606 to the image planner 602. An example of an arrangement of this type is shown in FIG. 12, where the feedback is via an expert system 610, which may comprise an automated system with or without human expert participation. This allows the processing engine to learn over time and to adapt its operations based on such learning.

Figure 13:
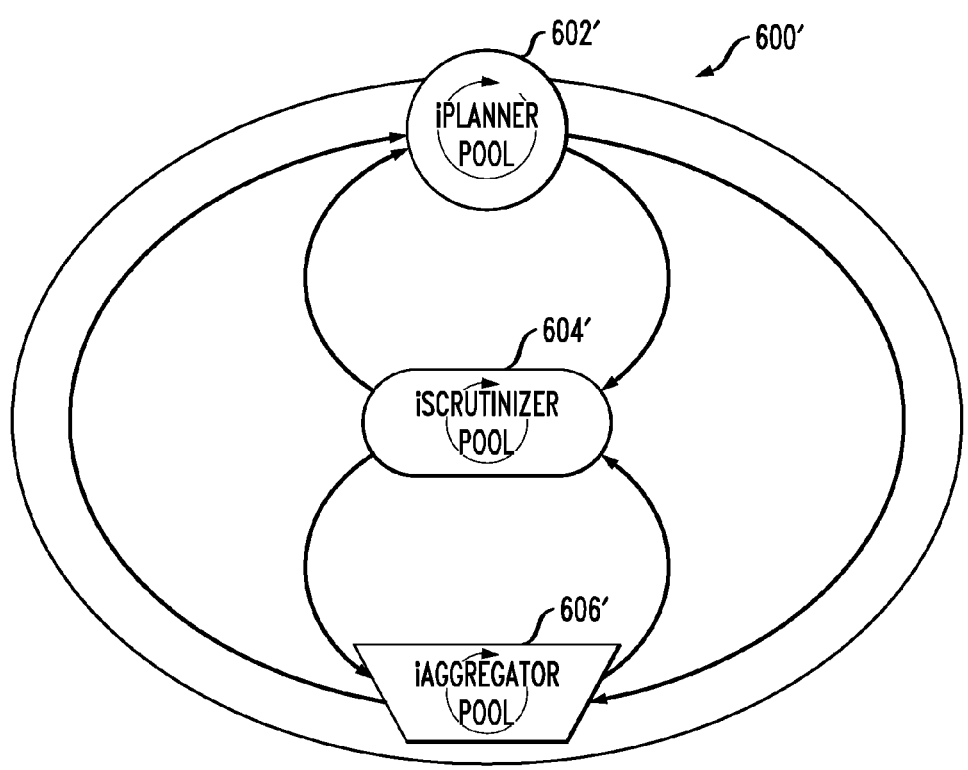
FIG. 13 illustrates pooling of image planner, image scrutinizer and image aggregator elements of an exemplary processing engine.

FIG. 13 shows an alternative embodiment of a processing engine 600' that includes dynamic pools of processing elements. More specifically, the pooled processing engine in this embodiment comprises a pool 602' of image planner elements, a pool 604' of image scrutinizer elements, and a pool 606' of image aggregator elements. The pools may correspond generally to the sets of elements 112, 114 and 116 in the image classifier 110 of FIG. 1. Such elements can be readily configured to provide a desired processing engine configuration under the control of the controller 118.

Figure 14:
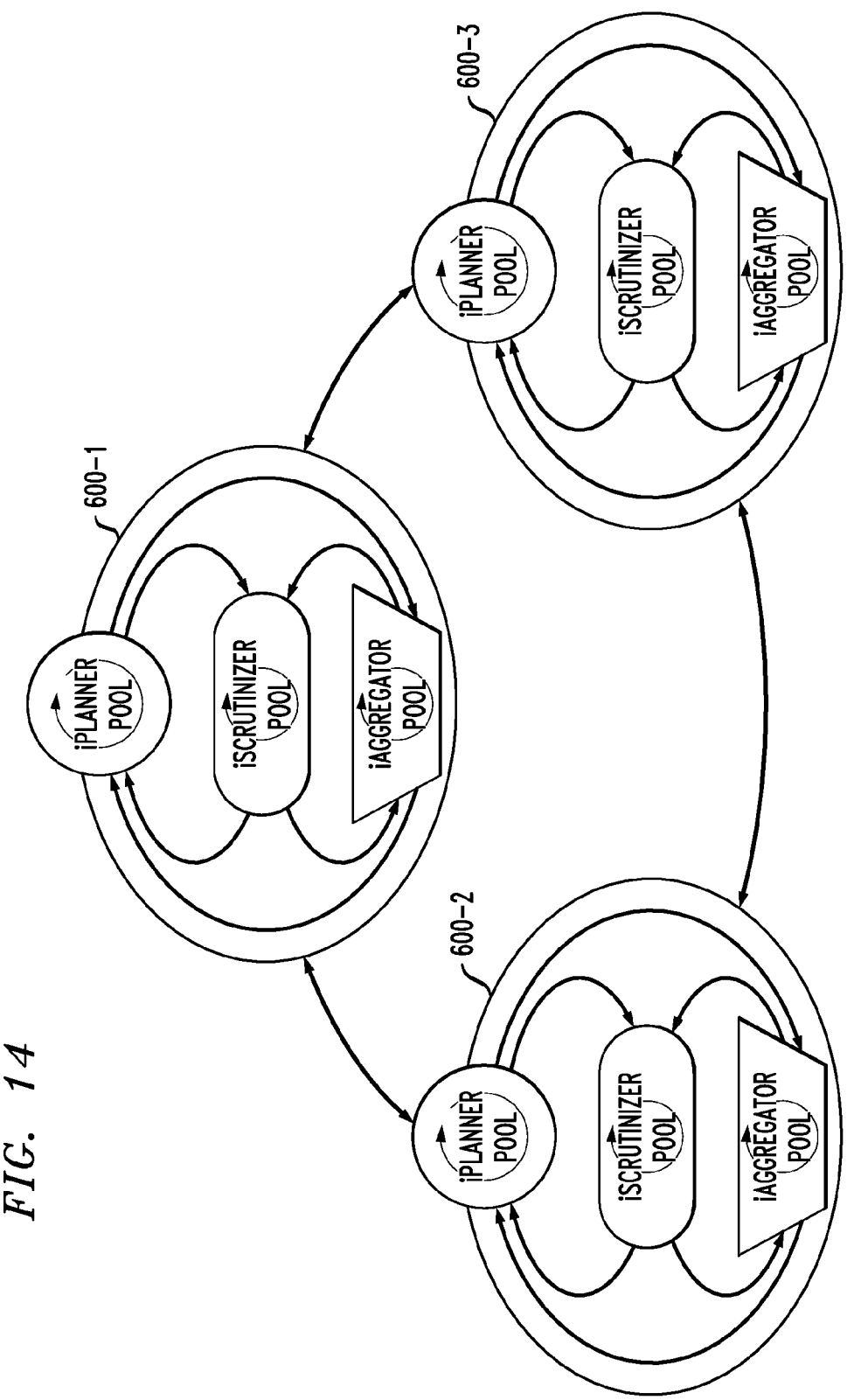
FIG. 14 illustrates interaction between multiple sets of element pools of the type shown in FIG. 13.
Figure 15:
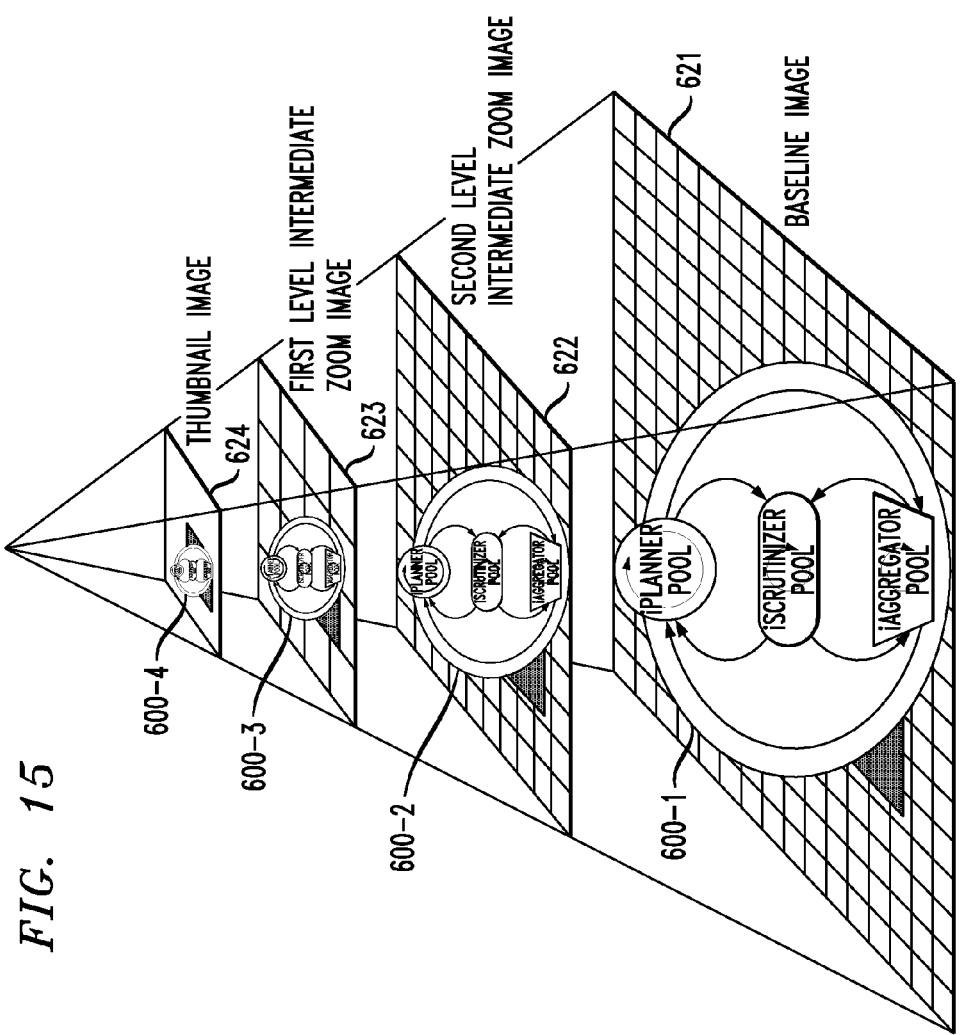
FIG. 15 illustrates the manner in which different pools of elements can be associated with different levels in a hierarchical arrangement of image data.

Multiple pooled processing engines of the type shown in FIG. 13 can be configured to interact with one another. An example of such an arrangement is illustrated in FIG. 14, and includes three separate pooled processing engines 600-1, 600-2 and 600-3, which are configured to interact with each other as shown. Each such processing engine may be associated with a different resolution level in a hierarchical arrangement of image data. By way of example, with reference to FIG. 15, a hierarchical arrangement of image data for a given image to be classified in image classifier 110 may comprise different levels for a baseline image 621, a second level intermediate zoom image 622, a first level intermediate zoom image 623, and a thumbnail image 624, which are arranged from bottom to top in order of decreasing image resolution. In the FIG. 15 embodiment, there is a separate pooled processing engine associated with each of the different resolution levels of the image hierarchy. More specifically, the processing engines 600-1, 600-2, 600-3 and 600-4 are associated with respective ones of the different resolution images corresponding to levels 621, 622, 623 and 624, and each such engine is used to process the image at its corresponding resolution level.

It should be noted that the particular processing engines and the associated image classification functionality described in conjunction with the diagrams of FIGS. 6 through 15 are presented by way of illustrative example only, and should not be construed as limiting the scope of the invention in any way. Alternative embodiments can use other types of processing engines and associated classification operations for diagnostic image analysis.

Various operations that may be performed by exemplary image planners 602, image scrutinizers 604 and image aggregators 606 in one or more embodiments of the present invention will now be described in greater detail.

An image planner 602 may be configured to assign a universal identification ("uid") to each image to be classified in the image classifier 110 as well as to each image-meta pair of that image. In the following description, the image will be denoted <sample-image> and the associated meta-information of the overall image will be denoted <sample-meta>. The corresponding individual tiles are image-meta pairs and will be denoted <sample-image-tile>, <sample-meta-tile>.

It is assumed for this embodiment that the image planner 602 receives at least some initial meta-information for each tile from the image data source 106, although in other embodiments one or more of the meta-tiles may be initially empty with the meta-information being generated only in conjunction with the image classification process itself. It is also assumed that another system element has subdivided the image into tiles. This system element may be the image data source 106, which may comprise a scanner or other type of image generator. Also, as indicated above, meta-information is also maintained for the entire image, and at least some of the meta-tiles may be at least in part duplicative of this image meta-information.

Therefore, each meta-tile may include at least a portion of the meta-information of the overall image, as well as additional information about that particular tile, such as its location in the overall image and information about its immediate neighbors. Such an arrangement facilitates image classification operations by allowing each tile to be self-informative regarding its relation to the overall image.

The image planner 602 is also preferably configured to supply each image-meta pair (<sample-image-tile>, <sample-meta-tile>) to the appropriate image scrutinizers 604. This may be via broadcast, multicast, unicast or other type of communication. The image planner may create logical groups of image scrutinizers such that similar types of tiles are managed by each such group of image scrutinizers. The criteria used to group image scrutinizers in this way may be based on the existence of certain specified colors in the tiles, or on other designated characteristics shared by the tiles. Many different types of logical groups may be used in a given embodiment, based on different facets of the meta-information that may guide a particular type of diagnostic image analysis.

The image planner 602 may be further configured to perform at least a subset of the following additional operations:

1. Managing statistics associated with the respective image tiles. For example, the image planner 602 may receive, analyze and temporarily store such statistics, as received from one or more image aggregators 606, in the form of a pair (<sample-image-tile-uid>, <statistics>) for each <sample-image-tile> within <sample-image>.

2. Generating for each tile an <analyzed-sample-meta-tile> using analytics derived from the <statistics> received for that tile and its neighboring tiles.

3. Constructing an <analyzed-sample-meta> for the <sample-image>, where each <analyzed-sample-image-tile> has been augmented with the respective <result> received from the corresponding image scrutinizers 604 for that tile and its neighboring tiles.

4. Sending a final compiled pair (<sample-image>, <analyzed-sample-meta>) as a response to an image classification request.

5. Accepting a human approval of the diagnostic analysis just performed, on a per-tile basis as well as on a per <analyzed-sample-meta> basis.

6. Transforming the pair (<sample-image>, <analyzed-sample-meta>) that has just been diagnosed into a list of pairs (<baseline-image-tile>, <baseline-meta-tile>).

7. Returning the newly approved (<baseline-image-tile>, <baseline-meta-tile>) back into the knowledge base 108 for use in subsequent image classification operations.

8. Accepting registration of additional image planner, image scrutinizer or image aggregator elements as needed to reconfigure the processing engine.

It should be noted that a given image classification request may be processed by multiple image planners 602 in a given processing engine, and the relevant image scrutinizers may send their respective comparison results back to each such image planner.

An image scrutinizer 604 may be configured to manage one or more baseline pairs (<baseline-image-tile>, <baseline-meta-tile>) and may also manage one or more additional image scrutinizers. The image scrutinizer may therefore be implemented as a recursive entity that manages multiple image scrutinizers each of which manages a smaller set of pairs to be analyzed. An image scrutinizer of this type may maintain a list of the other image scrutinizers that it manages, and may be responsible for ensuring that any such managed image scrutinizers are up and running and responding.

Each image scrutinizer 604 generally receives a given image-meta pair (<sample-image-tile>, <sample-meta-tile>), compares it against all of the baseline image-meta pairs it manages, and returns the result of the comparison as a triple (<sample-image-tile-uid>, <baseline-image-tile-uid>, <result>). If the image scrutinizer manages other image scrutinizers, it forwards a pair (<sample-image-tile>, <sample-meta-tile>) to each one of the image scrutinizers that it manages, and receives the triple (<sample-image-tile-uid>, <baseline-image-tile-uid>, <result>) from those managed image scrutinizers. It sends the triple (<sample-image-tile-uid>, <baseline-image-tile-uid>, <result>) back to the appropriate image planner 602 and to the appropriate image aggregators 606.

An image aggregator 606 may be configured to aggregate results produced by the image scrutinizers 604 by receiving several triples (<sample-image-tile-uid>, <baseline-image-tile-uid>, <result>) and returning a pair (<sample-image-tile-uid>, <statistics>). The image aggregator may aggregate results produced for a designated Region of Interest (ROI). This aggregation can be based, for example, on the <sample-image-tile-uid> which may describe the location of the tile within the overall image. The image aggregator may also identify areas of the image in which all or most of the tiles produce a positive or negative result within a certain margin, and therefore could be used to automate the determination of a particular ROI. The image aggregator may also be configured to ensure that statistics are only aggregated per <sample-image-tile-uid>, ensuring the accuracy of the results per sample image. The image aggregator may not report the <statistics> for the sample image until  have first been received and processed from a sufficient number of image scrutinizers 604.

It should be noted that a single virtual processing component within or otherwise available to the image classifier 110 may be reconfigured as needed to operate either as an image planner, an image scrutinizer or an image aggregator. Thus, for example, an image aggregator 606 may be implemented by appropriate configuration of a virtual component that can later be reconfigured in another way to implement an image scrutinizer 604.

An image planner 602 or other system element can perform de-duplication operations. For example, as the knowledge base 108 grows, some images or image tiles that are very similar to one another may not add much additional information to the knowledge base. Thus, when a classification operation provides a result whose error margin in similarity relative to a previously classified image or image tile is very small, the system may mark the two images or image tiles as being approximately equal and make a decision as to which one should be saved as the newest sample.

As a more particular example, an image scrutinizer 604 may mark image tiles in this manner and pass that information to an image aggregator 606, which may then provide a list of near-duplicate image tiles back to the image planner 602. The image planner may then use this information to determine which image-meta pairs will be subject to further processing in the system. The de-duplication operation may involve eliminating one of the near-duplicates, or combining them and storing a range of values instead of absolute values. For example, assume that the difference between two image tiles is the intensity of the blue in one unit, from x units to x+1 units. The new image tile may now specify that the intensity of the blue may range in the interval <x:x+1>.

An image scrutinizer 604 may also learn over time by counting the number of different image tiles that it identifies as near-duplicates. More specifically, the image scrutinizer can increment a counter each time it detects such near-duplicates, and the current counter value can be added to the meta-information for the corresponding tiles.

An image planner 602 or image aggregator 606 may create more coarse images based on comparison results received from the image scrutinizers 604. For example, based on comparison results, an image aggregator or image planner may convert a region of 16 tiles by 16 tiles into a single tile. This approach can be used to produce different resolution levels such as those shown in FIG. 15, and the diagnostic image analysis can be formed at a selected resolution level or at multiple resolution levels. More granular regions may be abstracted into less granular regions with a summary of the analytics performed.

Also, image tiles may be classified into groups based on the meta-information, and an image planner 602 may select the particular image scrutinizers 604 that will receive certain tiles based on such groupings.

A processing engine configured in the manner described above with reference to FIGS. 6 through 15 may be utilized to process any type of image data. As noted previously, possible applications include digital pathology, security applications involving image or face recognition, and oil and gas exploration applications involving analysis of geological images, but the disclosed techniques are more generally applicable to any other field involving diagnostic image analysis.

By way of example, an information specification for a digital pathology application will now be described in greater detail. In such an application, the tile meta-information is configured to capture essential pathology grade characteristics, and may include the following information:

Key determination factor:
  High degree of inter-observer and intra-observer variability
Reflected in:
  Tissue architecture
  Nuclear arrangement
Requires:
  Characterization of spatial arrangement
  Distribution of histological structures such as:
    Nuclei
    Lymphocytes
    Glands
May also include:
  Disease outcome
  Survival Rate For this meta-information example, the specification of <image-tile-meta>, <result> and <statistics> may be given as follows:

Specification of <image-tile-meta>
  Universal Identification ("uid")
  Original color: multi color or single color, and which color(s)
  Color intensity for each color stored
  Date tile image was taken
  Date tile image was scanned
  Gender of owner
  Date of birth
  Ethnicity
  Region of interest: Is this tile part of a region of interest, and if so, which position within matrix of tiles
  Disease diagnosed in the tile
  Disease diagnosed in the image that contains the tile, but not in this tile
  Type of specimen
  Part of the body
Specification of <result>
  Matches: yes/no
  Diagnostic status of sample: positive/negative
  If positive: <disease-id>, if negative: <null-disease-id>
  If matches: some degree of <tile-meta-info>
Specification of <statistics>
  Total of Comparisons
  Total of Matches/Positive
  Total of Matches/Negative
  Optional field: List with (<disease-id>, <count>), assuming that the list of diseases is short. Assuming that we maintain a specific ordering system for the <disease-id> and only add new diseases to the end of the list, this field could consist of simply a list of (<count>), where the order of each element on the list represents the accumulative number of times that there was a match with a sample diagnosed with that particular disease.
  Number of no matches can be inferred by:
    Total Comparisons−Total of Matches/Positive−Total of Matches/Negative The particular processing operations and examples described above are presented by way of illustrative example only, and should not be construed as limiting the scope of the invention in any way. Alternative embodiments can use other types of processing operations for diagnostic image analysis.

The illustrative embodiments provide numerous advantages over conventional techniques. For example, one or more of these embodiments can provide an automated process for leveraging the results of previous image analyses in an accurate and efficient manner. The techniques described can therefore be used to combine analysis results for large numbers of images, thereby facilitating subsequent image analyses as well as the gathering of associated statistical information. Also, image analysis performance is improved in a manner that conserves processor and memory resources.

As mentioned previously, a diagnostic image analyzer comprising one or more processing engines formed using various combinations of image planner, image scrutinizer and image aggregator elements can be configured for massive parallel processing of image data, using large numbers of geographically distributed servers, computers or other machines connected to the Internet.

As noted above, diagnostic image analysis functionality such as that described herein can be implemented at least in part in the fotni of one or more software programs stored in memory and executed by a processor of a processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and diagnostic image analysis applications. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
  a diagnostic image analyzer comprising an image classifier coupled to a controller;
  wherein the controller is configured to implement an image processing engine for performing at least a portion of a classification operation on at least a portion of an image, the image processing engine comprising an interconnection of at least one image planner element, a plurality of image scrutinizer elements and at least one image aggregator element;
  wherein the image planner element is configured to organize the plurality of image scrutinizer elements into two or more logical groups of image scrutinizer elements based at least in part on one or more criteria to be used in performing the classification operation;
  wherein a given one of the logical groups comprises two or more image scrutinizer elements corresponding to different ones of two or more processing layers for one or more specified comparison criteria; and wherein at least a portion of the classification operation is processed by the given logical group by propagating at least a portion of the image from a higher one of the processing layers to a lower one of the processing layers in the logical group responsive to matching one or more specified comparison thresholds for said one or more specified comparison criteria at the higher layer.

2. The apparatus of claim 1 wherein the image classifier is configured to perform the classification operation on the image, based at least in part on information from a knowledge base of one or more previously classified images, using the image processing engine.

3. The apparatus of claim 1 wherein the image subject to the classification operation is subdivided into a plurality of different sub-portions with each such sub-portion having separately-identifiable meta-information associated therewith, a given one of the sub-portions and its associated meta-information collectively comprising an image-meta pair.

4. The apparatus of claim 3 wherein the meta-information associated with the given sub-portion comprises information indicative of one or more designated characteristics that are present within the given sub-portion.

5. The apparatus of claim 4 wherein the image planner element is further configured to distribute the given sub-portion to at least one of the logical groups of image scrutinizer elements based at least in part on one or more designated characteristics of the image-meta pair associated with given sub-portion.

6. The apparatus of claim 3 wherein:
the image planner element is further configured to distribute image-meta pairs, corresponding to respective sub-portions of the image subject to the classification operation, to the logical groups of image scrutinizer elements;
each of the image scrutinizer elements is configured to compare at least one received image-meta pair supplied by the image planner element against at least one set of one or more image-meta pairs it manages; and
the image aggregator element is configured to combine results of the image scrutinizer comparisons.

7. The apparatus of claim 1 wherein the image planner element is further configured to distribute respective sub-portions of the image subject to the classification operation to at least one of the logical groups of image scrutinizer elements based at least in part on one or more designated characteristics associated with the respective sub-portions of the image.

8. The apparatus of claim 7 wherein the one or more designated characteristics comprise relative concentrations of one or more colors associated with the respective sub-portions of the image.

9. The apparatus of claim 1 wherein the image planner element is further configured to distribute a given sub-portion of the image in parallel to two or more of the logical groups of image scrutinizer elements.

10. The apparatus of claim 1 wherein a given one of the image scrutinizer elements is associated with two or more of the logical groups of image scrutinizer elements.

11. The apparatus of claim 1 wherein the image planner element is further configured to organize image scrutinizer elements from at least one dynamic pool of processing elements into the two or more logical groups of image scrutinizer elements.

12. The apparatus of claim 11 wherein the image planner element is further configured to reorganize the logical groups of image scrutinizer elements responsive to addition or removal of one or more image planner elements, image scrutinizer elements and image aggregator elements from the dynamic pool of processing elements.

13. A method comprising:
configuring an image processing engine for performing at least a portion of a classification operation on at least a portion of an image, the image processing engine comprising an interconnection of at least one image planner element, a plurality of image scrutinizer elements and at least one image aggregator element;
organizing the plurality of image scrutinizer elements into two or more logical groups of image scrutinizer elements based at least in part on one or more criteria to be used in performing the classification operation;
wherein a given one of the logical groups comprises two or more image scrutinizer elements corresponding to different ones of two or more processing layers for one or more specified comparison criteria; and
wherein at least a portion of the classification operation is processed by the given logical group by propagating at least a portion of the image from a higher one of the processing layers to a lower one of the processing layers in the logical group responsive to matching one or more specified comparison thresholds for said one or more specified comparison criteria at the higher layer.

14. The method of claim 13 further comprising performing the classification operation on the image, based at least in part on information from a knowledge base of one or more previously classified images, using the image processing engine.

15. The method of claim 13 further comprising distributing respective sub-portions of the image subject to the classification operation to at least one of the logical groups of image scrutinizer elements based at least in part on one or more designated characteristics associated with the respective sub-portions of the image.

16. The method of claim 15 wherein the one or more designated characteristics comprise relative concentrations of one or more colors associated with the respective sub-portions of the image.

17. A computer program product comprising a non-transitory processor-readable storage medium having encoded therein executable code of one or more software programs, wherein the one or more software programs when executed by a processing platform implement the method of claim 13.

18. An information processing system comprising:
an image classifier implementing an image processing engine for performing at least a portion of a classification operation on at least a portion of an image, the image processing engine comprising an interconnection of at least one image planner element, a plurality of image scrutinizer elements and at least one image aggregator element; and
wherein the image planner element is configured to organize the plurality of image scrutinizer elements into two or more logical groups of image scrutinizer elements based at least in part on one or more criteria to be used in performing the classification operation;
wherein a given one of the logical groups comprises two or more image scrutinizer elements corresponding to different ones of two or more processing layers for one or more specified comparison criteria; and
wherein at least a portion of the classification operation is processed by the given logical group by propagating at least a portion of the image from a higher one of the processing layers to a lower one of the processing layers in the logical group responsive to matching one or more specified comparison thresholds for said one or more specified comparison criteria at the higher layer.

19. The method of claim 13, wherein organizing the plurality of image scrutinizer elements comprises:
 organizing image scrutinizer elements from at least one dynamic pool of processing elements into the two or more logical groups of image scrutinizer elements; and
 reorganizing the logical groups of image scrutinizer elements responsive to addition or removal of one or more image planner elements, image scrutinizer elements and image aggregator elements from the dynamic pool of processing elements.

20. The system of claim 18, wherein the image planner element is further configured:
 to organize image scrutinizer elements from at least one dynamic pool of processing elements into the two or more logical groups of image scrutinizer elements; and
 to reorganize the logical groups of image scrutinizer elements responsive to addition or removal of one or more image planner elements, image scrutinizer elements and image aggregator elements from the dynamic pool of processing elements.

\* \* \* \* \*